Figure 1:
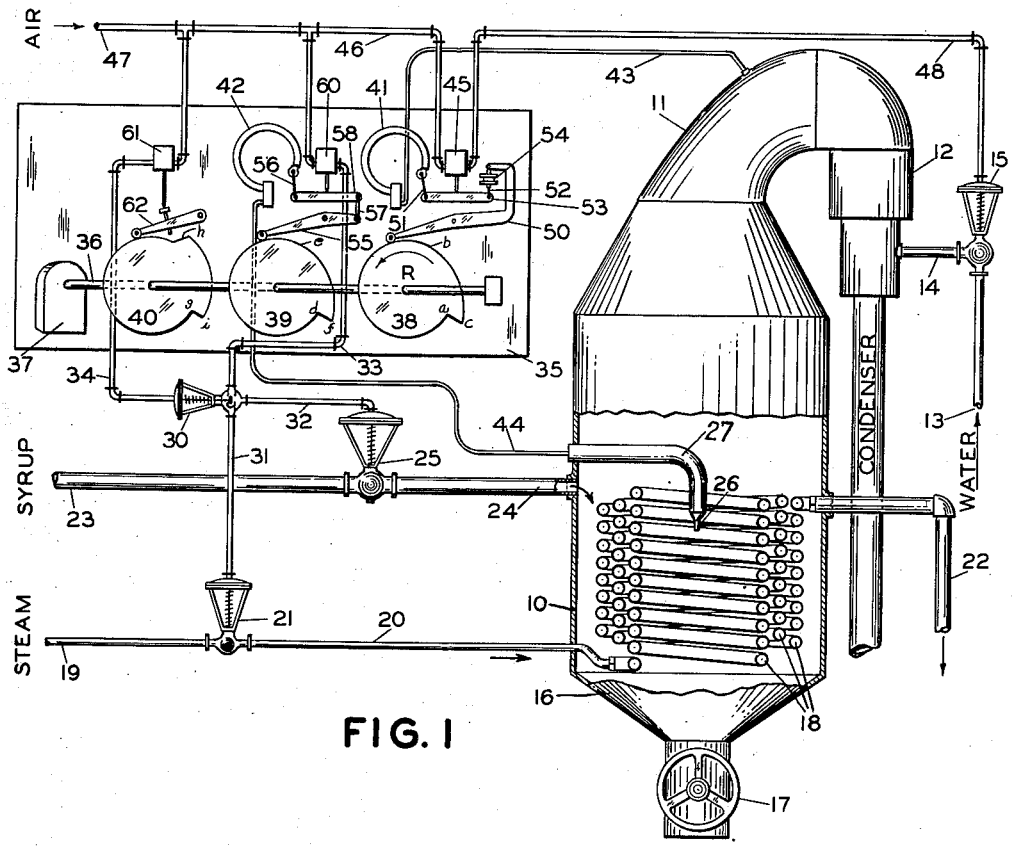

Aug. 22, 1950     E. L. STILSON     2,519,608
CONTROL APPARATUS FOR EVAPORATORS
Filed July 10, 1944

INVENTOR.
EDGAR L. STILSON
BY
E.C. Sanborn
ATTORNEY

Patented Aug. 22, 1950

2,519,608

UNITED STATES PATENT OFFICE 2,519,608

CONTROL APPARATUS FOR EVAPORATORS

Edgar L. Stilson, Cheshire, Conn., assignor to The Bristol Company, Waterbury, Conn., a corporation of Connecticut Application July 10, 1944, Serial No. 544,258

7 Claims. (Cl. 159—44)

This invention relates to automatic control devices, and more especially to a method and means for regulating conditions in a processing vessel wherein pressure and temperature are subject to a plurality of influences, and must be carried through a predetermined time cycle of related values. While the invention is applicable to a large variety of processes where such conditions are to be fulfilled, it will be described in its special utilization in the control of conditions existing within a vacuum pan such as is employed in the evaporation of a syrup, preceding the formation of sugar crystals therein.

In the treatment of sugar syrup the liquid is admitted to a closed vessel, known as a vacuum pan, and containing a group of coils adapted to be heated by the admission of steam thereto. The upper portion of the vessel is connected with a condenser of the barometric type, or some other device whereby the internal pressure may be maintained at a predetermined value considerably below atmospheric. As the syrup is admitted to the vacuum pan the pressure is caused to be reduced until a relatively high vacuum exists, under which condition the syrup under the joint influence of its contained heat and of that derived from the steam coils, boils or evaporates at a relatively low temperature. Evaporation is allowed to continue for a time which may be varied between 1 and 10 hours, depending on the type of sugar in process.

After the lapse of the normal evaporation period, during which time the syrup is maintained at predetermined steady values of pressure and temperature, as hereinbefore set forth, crystallization is initiated by causing these magnitudes to be suitably varied. The common procedure consists in increasing the pressure in the vacuum pan at a constant rate to be a value approximately 10" of mercury absolute (or 20" of vacuum), while at the same time the temperature is raised at a constant rate to a value approximately 180° F., the exact value depending upon the type of sugar.

In order that the crystals be uniform in size and quality, it is essential that the temperature and pressure both be maintained within relatively limited ranges during the period of treatment. If crystallization is premature there develops a condition known as "false grain"; and the correction of this condition necessitates the admission of more water to the pan in order to redissolve the crystals, making it necessary that the crystallization process start afresh at the beginning. The formation of "false grain" therefore represents a loss of operators' time, a waste of steam, and, of course, an over-all capacity reduction in the evaporating equipment; thus making apparent the need for eliminating the possibility of development of such a condition.

In the control of the several variables involved in the operation of a vacuum pan, it has heretofore been the practice to effect the desired regulation by means of manually actuated valves whose operation was based on the observation of pressure gauges, thermometers, etc., and to a great extent dominated by the judgment of individual operators, which method at its best, allows an undesirable latitude of operation, with corresponding lack of uniformity in crystal size, together with frequent formation of "false grain" as hereinbefore set forth.

It is an object of the present invention to provide automatic means whereby the several functions involved in evaporating syrup to the crystallizing stage, and subsequently preparing the contents of a vacuum pan for discharge, are carried out according to a predetermined sequence and without the interposition of manual control.

It is a further object to provide means of the above nature, which shall take cognizance of, and correct for, variations in the flow or pressure both of fluids being processed and those utilized in carrying out the process.

It is a further object to provide means of the above nature, which shall be readily adjustable to accommodate the control cycle to different qualities of material supplied and to different types of product required.

In effecting the purposes of the invention, in the embodiment here illustrated, it is proposed to control the temperature of the contents of an evaporator or vacuum pan during the first, or steady-state, interval of a batch process by automatically regulating the rate of admission of said contents while heat is supplied at a substantially constant rate, and to coordinate with said temperature-control function the regulation of absolute pressure within said evaporator by automatically varying the action of a condenser or other exhaust device for removing the products of evaporation. It is further proposed to provide means whereby, at the termination of the steady-state interval of the process, the function of temperature control is transferred from a regulation of the rate of admission of material under treatment to a regulation of the rate of admission of the heating agent, while the amount of material in process remains substantially unchanged.

In the drawings: Fig. 1 is a diagrammatic representation, partly in section, of a control system embodying the principles of the invention as applied to the regulation of conditions within a vacuum pan employed in the evaporation of sugar syrup.

Figure 2:
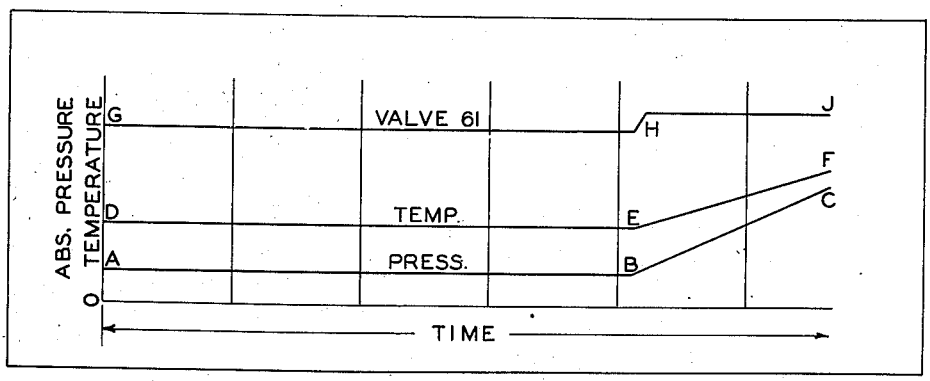

Fig. 2 is a graphical representation of the performance of certain elements of the apparatus shown in Fig. 1.

Referring now to the drawings: The numeral 10 designates an evaporator or "vacuum pan" of a conventional type adapted to the evaporation of sugar syrup or the like at low absolute pressures, whereby the use of undesirably high temperature is obviated. The upper portion of the evaporator 10 terminates in a "gooseneck" section 11 which in turn is connected with a barometric or jet condenser 12 or other device for continuously removing condensible vapor and maintaining the fluid pressure within said evaporator at a value substantially below atmospheric. Operation of the condenser 12 is effected by the admission of water to same from a source 13 through a pipe 14, in which is interposed a pneumatically actuated valve 15 whereby the flow of said water can be regulated.

The lower part of the evaporator 10 includes a funnel shaped portion 16 having therein a large gate or valve 17 through which the contents of the vessel may be removed at the conclusion of a batch treatment. Within the lower portion of the evaporator 12 is positioned an annular coil or steam chest 18 in heat-exchange relation with the contents of said evaporator and adapted to receive a supply of steam or other heating agent from a source 19 through a pipe 20 in which is interposed a pneumatically operated valve 21 of the "direct-acting" class, i. e., of the type which tends to close under the application of air pressure and reverts to an open position when said pressure is removed. A vent pipe 22, connected to the coil 18, and, if necessary, suitably "trapped," provides an exhaust or drain for said coil.

Syrup or other liquid material to be subjected to treatment in the evaporator 10 is admitted from a source 23 through a conduit 24 in which is interposed a pneumatically operated valve 25 of the "reverse-acting" class, in which the valve normally stands closed, and is opened by the application of pneumatic pressure to its actuating element.

Suitably positioned within the evaporator 10 and preferably substantially centrally of the coil 18 is a temperature-sensitive element 26 here indicated as a closed bulb, containing a suitable volatile or expansible fluid adapted by its pressure to provide a measure of the temperature of the liquid within which said bulb is immersed. Because of the conditions existing within the evaporator it may be desirable that the bulb 26 be supported and mechanically reinforced by a relatively massive mounting member 27, which may take any one of a variety of forms forming no part of the present invention.

Coordinated action of the elements of apparatus as thus far described, is obtained by the following means: A pneumatically actuated three-way selector valve 30 has its several ports connected respectively to three conduits, 31, 32 and 33, the first of these communicating with the operating element of the pneumatically actuated valve 21, the second with the corresponding part of the valve 25 and the third with instrumentalities presently to be set forth. The operating element of the valve 30 is connected to a conduit 34, and the connections are made such that, when air pressure is applied to said last-named conduit, the seating member of the valve 30 assumes a position in which conduit 33 is cut off from communication with conduit 32 and placed in communication with conduit 31, and, when pressure in conduit 34 is relieved, the valve 30 reverts to a position where conduit 33 is in communication with conduit 32 and cut off from conduit 31. Conduits 31 and 32 may, if desired, be provided with adjustable leaks in order that when air is not being admitted to them the pressure therein will fall to atmospheric. On the other hand, valve 30 may be provided with ports and a seating arrangement whereby this function will be effected without the waste of air which characterizes the use of permanent leak.

A control instrument 35 includes a shaft 36 adapted to be rotated at a constant angular velocity by means of a timing motor 37. Said shaft carries three cam members 38, 39 and 40 having conformed contours, and all rotatable with the shaft in a sense as indicated by the arrow R in the drawings. Mounted within the instrument 35 are two pressure-sensitive elements, e. g. Bourdon tubes, 41 and 42, the mounting of each being such that upon a reduction of internal fluid pressure the free end will be deflected in a downward sense as seen in the drawing. Bourdon tube 41 is connected by means of a conduit 43 to the upper portion 11 of the evaporator 10, whereby to provide a measure of the pressure existing within said evaporator. Bourdon tube 42 is connected by means of a capillary tube 44 to the bulb 26, whereby to provide a measure of the temperature of the liquid contents of the evaporator.

Mounted within the instrument 35 is a pilot valve 45 having an inlet port connected to a conduit 46, communicating with a source 47 of air under pressure, and an outlet port connected by means of conduit 48 to the actuating element of the valve 15, whereby the actuation of said pilot valve 45 will regulate the pressure upon, and thus the degree of opening of, the valve 15.

Pivotally mounted in the instrument 35 is a cam-follower arm 50 adapted to engage the periphery of the cam member 38 and thereby to be angularly deflected through a limited range in accordance with the conformation of the profile of said cam member. Jointly supported by a link 51 attached to the Bourdon tube 41 and by a link 52 attached to the cam-follower arm 50 is a floating lever 53 adapted to partake of a motion which shall be the resultant of the displacements of said Bourdon tube and said follower arm.

The link 52 includes a barometric capsule 54, deformable with variation in atmospheric pressure, whereby the motion imparted to the floating lever 53 when the cam-follower arm 50 is at rest is the algebraic sum of "gauge" pressure within the evaporator and atmospheric pressure exterior thereto, and therefore, by proper proportioning of related parts, may be made a measure of the absolute pressure existing within said evaporator. The utilization of a differential lever in the measurement of absolute pressure presents no novelty; and an instrument embodying this principle, and especially adapted to the purposes of the invention, is fully set forth and disclosed in U. S. Letters Patent No. 1,962,324 granted to A. Noble, June 12, 1934.

The valve 45 being suitably located with respect to the floating lever 53, the setting of the valve 15 will be subject to the displacement of said lever arm, whence, assuming the cam follower arm 50 to be at rest, the action of the condenser may be so regulated as to maintain within the evaporator 10 a constant and predetermined value of absolute pressure.

Pivotally mounted in the instrument 35 is a cam-follower arm 55 adapted to engage the periphery of the cam member 39 and to be angularly deflected thereby through a limited range in accordance with the conformation of the profile of said cam member. Connected to the Bourdon tube 42 by means of a link 56, and to the cam-follower arm 55 by means of a link 57, is a floating lever 58 adapted to partake of a motion which shall be the resultant of the displacement of said Bourdon tube and said follower arm. A pilot valve 60 mounted within the instrument 35 and adapted for actuation by the floating lever 58, provides controllable connection between the conduit 46 and the conduit 33, which, as hereinbefore set forth, communicates alternatively with the actuating elements of the valves 21 and 25, according to the position of the valve 30.

A pilot valve 61 mounted within the instrument 35 provides controllable connection between the conduits 46 and 34; and a cam-follower arm 62, mounted within said instrument, and adapted to cooperate with the periphery of the cam member 40, operatively engages said pilot valve, whereby the same will be actuated in accordance with the conformation of the profile of the cam member 40.

The conformation of the profiles of the respective cam members will be understood by reference to Fig. 2, providing graphical representation of the typical variations of pressures and temperature involved during the time of treatment of a batch of syrup. These graphs, represented on a scale of polar coordinates, are transferred to the cams 38 and 39 respectively and so proportioned that as said cams are rotated at a constant velocity by the timing motor 37 the follower arms 50 and 55 will by their displacements tend to modify the positions of the pilot valves 45 and 60, whereby the pressure and temperature control points will be correspondingly varied, and said conditions within the evaporator 10 caused to progress through a predetermined cycle of values. As hereinbefore set forth, the process of evaporation of sugar syrup and the like is preferably characterized by the maintenance of pressure and temperature conditions respectively at steady values for an extended interval of time, followed by a relatively rapid increase in each until the batch under treatment attains a desired condition, whereupon the cycle is terminated and the contents of the evaporator discharged therefrom. In the time pressure curve as shown in Fig. 2 the portion A—B represents the steady-state condition, and the portion B—C the increase in absolute pressure characterizing the concluding interval of the treatment. Similarly, the portion D—E on the temperature curve corresponds to the time during which the temperature is held constant, and the portion E—F to the rise of temperature at the close of treatment. These curves, transferred to the cams 38 and 39 in the instrument 35, are represented by the portions a—b and b—c respectively of the former and d—e and e—f respectively of the latter cam element.

Transfer of the temperature controlling function from the syrup valve 25 to the steam valve 21 is effected by the three-way valve 30 under command of the pilot valve 61, the latter being actuated by the arm 62 in response to changes in the effective radius of the cam member 40. The two positions of the pilot valve 61 are graphically represented in Fig. 2. The portion G—H corresponds to the closed position of the pilot valve 61, in which no pressure is applied within the conduit 34, with the consequence that the position of the syrup valve 25 is under control of the pilot valve 60, and the steam valve 21 is maintained in a wide open condition. The portion H—J represents that part of the cycle when the pilot valve 61 is opened to admit air pressure to the conduit 34 which pressure acts upon the three-way valve 30 in a sense to cause the syrup valve 25 to close and the steam valve 21 to be placed under automatic control. The graph G—H—J, when transferred to the cam member 40, is represented by two portions g—h and h—i of circular conformation but of different radii, joined by a portion h representing an abrupt transition from the closed to the open condition of the pilot valve 61.

A typical cycle of operation of the apparatus as described may be outlined as follows: During the filling of the evaporator, the several elements of the controlling instrument 35 will occupy positions as indicated in Fig. 1, the follower arm 50 resting on the peripheral portion a—b of the cam member 38, the follower arm 55 upon the portion d—e of the cam 39 and the arm 62 upon the portion g—h of the cam 40. Under these conditions the water valve 15, having control pressure applied thereto through the pilot valve 45 as positioned by the joint influence of the barometric capsule 54, and the Bourdon tube 41 communicating through the conduit 43 with the interior of the evaporator 10, will be actuated in a sense to cause the condenser 12 to maintain within said evaporator a constant absolute pressure of a value determined by the deflected position of the cam follower arm 50.

The cam-follower arm 62, resting on the portion g—h of the cam element 40, will cause the pilot valve 61 to be closed, so that the three-way transfer valve 30 will place the syrup valve 25 under command of the pilot valve 60, at the same time removing air pressure from the actuating element of the steam valve 21. Said steam valve, being of the direct-acting class, will thus stand in its full open position, allowing steam to pass through the coils 18 at a substantially constant, but unregulated, rate. The pilot 60, being responsive through the lever 58 and the Bourdon tube 42 to the temperature conditions to which the bulb 26 is exposed, the valve 25 will be actuated to control the admission of syrup into the evaporator at a rate where its ultimate temperature therein will be maintained at a value as predetermined by the deflected position of the cam-follower arm 55. The temperature of the entering syrup being below the boiling point which corresponds to the pressure within the evaporator, and heat being supplied by the steam coils 18 at a substantially constant rate, it follows that in order to cause the temperature of the contents of the evaporator to rise, the operation of the control system will require to be made such that a decrease in temperature, producing a corresponding deformation in the Bourdon tube 42, will cause the pilot valve 60 to be actuated in a sense to reduce the pressure in the conduits 33 and 32. Thus the reverse-acting valve 25 will tend to close, thereby reducing the rate of admission of the syrup to the evaporator and permitting the temperature of the contents as influenced by heat derived from the coils 18 to rise to a corresponding extent.

The conditions as thus far set forth correspond to those indicated in the left hand section of the graphs shown in Fig. 2, the absolute pressure following the constant value represented as A—B, and the temperature that as D—E, corresponding to the boiling point of the syrup at said pressure, while the position of the pilot valve 61, commanding the transfer valve 30, remains fixed, corresponding to the constant level G—H. Under the normal cycle for the evaporation of sugar syrup, these conditions continue without change as a progressively increasing volume of syrup accumulates in the evaporator, the rate of admission being automatically regulated by the valve 25 so that evaporation proceeds at the desired predetermined rate.

After the expiration of a time interval established by experiment, experience, or otherwise and expressed by the contours of the respective cam members, the crystallization phase of the operating cycle is introduced by suitable modifications in said controls. The shaft 36, carrying said cam members will have rotated to a position whereby the points b, e and h of the several cams (corresponding to the points B, E, and H in the graphs shown in Fig. 2) will engage their respective follower arms with the following results: The arm 62 will be abruptly moved to a position where it opens the pilot valve 61, applying air pressure to the three-way transfer valve 30, whereby conduit 32 is cut off from communication with the regulated air pressure in conduit 33, and the valve 25 caused to close, shutting off the supply of syrup to the evaporator. At the same time the conduit 31 is placed in communication through the conduit 33 with the pilot valve 60, whereby the steam valve 21 will be brought under control of said pilot valve. Since the valve 21 is of the direct acting class, in which an increase of applied control pressure tends to reduce the flow therethrough, it will be seen that the regulation of temperature effected by the system including the bulb 26 and elements subject thereto will be in the same sense as before, and the valve 21 will assume the function carried out by the valve 25 during the period of admission of cool syrup to the evaporator.

As the cam members 38 and 39 continue to rotate with the shaft 36, the follower arms 50 and 55 will be displaced in correspondence with the progressively increasing effected radii of said cams, with a resulting lowering of the right hand extremities of the floating levers 53 and 58 as seen in the drawing, and a corresponding increase in the settings of both the pressure and temperature control points. Consequently, both the absolute pressure and the temperature within the evaporator will be progressively increased, introducing the desired conditions for termination of the cycle.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for controlling the temperature of a fluid material in a processing container having conduit means for admitting said material, valve means in said conduit means, conduit means for admitting a temperature-affecting agent, and valve means therefor; said apparatus including means in heat-conducting relation to the material in said container and responsive to changes in temperature of said material in said container for correspondingly varying the pressure of a control fluid, a selector valve operatively connected with both said valve means for applying said control fluid alternatively to the operation of said first or said second valve means, and timing means for actuating said selector valve at a predetermined instant whereby to change the regulation of temperature of said material from control of admission of the same to control of admission of said temperature-affecting agent.

2. Apparatus for controlling the temperature of a fluid material in a processing container having conduit means for admitting said material, valve means in said conduit means, conduit means for admitting a temperature-affecting agent and valve means therefor; said apparatus including means in heat-conducting relation to the material in said container and responsive to changes in temperature of said material in said container for correspondingly varying the pressure of a control fluid, a three-way valve operatively connected with both said valve means for normally cutting off said control fluid from said second valve means and applying said fluid to said first valve means so that said first valve means is subject to the variations in pressure of said fluid while said second valve means is unresponsive thereto, a timer, and connections controlled by said timer for actuating said three-way valve at a predetermined instant for cutting off said control fluid from said first valve means and applying said fluid to said second valve means so that said second valve means is subject to variations in pressure of said fluid while said first valve means is unresponsive thereto.

3. Apparatus for controlling the temperature of a fluid material in a processing container having conduit means for admitting said material, valve means in said conduit means, conduit means for admitting a temperature-affecting agent and valve means therefor; said apparatus including a fluid pressure conduit, means in heat sensing relation to the material in said container and responsive to changes in temperature of said material in said container for correspondingly varying the pressure of a fluid in said conduit, a three-way valve operatively connected with both said valve means for normally connecting said conduit to said first valve means and disconnecting said conduit from said second valve means, a timer, and cyclically operating means connected to said timer and to said three-way valve for actuating said three-way valve at a predetermined instant in the cycle to disconnect said conduit from said first valve means and connect said conduit to said second valve means.

4. Apparatus for controlling the temperature of a fluid material in a processing container having conduit means for admitting said material, valve means in said conduit means, conduit means for admitting a temperature-affecting agent and valve means therefor; said apparatus including a fluid-pressure conduit, means in heat sensing relation to the material in said container and responsive to changes in temperature of said material in said container for correspondingly varying the pressure of a fluid in said conduit, a three-way valve operatively connected with both of said valve means for normally connecting said conduit to said first valve means and disconnecting said conduit from said second valve means, a cyclically operating timing element, connections controlled thereby for actuating said three-way valve at a predetermined instant for disconnecting said conduit from said first valve means and connecting said conduit to said second valve means, another timing element, and means operated by the last mentioned timing element for varying the fluid pressure in said conduit while the latter is connected to said second valve means.

5. Apparatus for controlling the temperature of a fluid material in a processing container having conduit means for admitting said material, valve means in said conduit means, conduit means for admitting a temperature-affecting agent and valve means therefor; said apparatus comprising means in heat sensing relation to the material in said container and responsive to temperature in said container, pilot valve means having a fluid pressure conduit connected thereto and controlled by said temperature-responsive means for varying the pressure in said conduit in accordance with the temperature in said container, fluid-pressure conduits connected to said first and second valve means respectively, selector valve means communicating with all of said conduits and operable to one position in which said pilot valve conduit is in communication with the fluid pressure conduit of the first valve means and to another position in which said pilot valve conduit is in communication with the fluid pressure conduit of said second valve means, a motor-driven timer, and cyclically operating means comprising a member driven by said timer for causing operation of said selector valve means from the first to the second mentioned position thereof at predetermined times.

6. Apparatus for controlling the temperature of a fluid material in a processing container having conduit means for admitting said material, valve means in said conduit means, conduit means for admitting a temperature-affecting agent and valve means therefor; said apparatus comprising means in heat sensing relation to the material in said container and responsive to temperature in said container, pilot valve means having a fluid-pressure conduit connected thereto and controlled by said temperature-responsive means for varying the pressure in said conduit in accordance with the temperature in said container, fluid-pressure conduits connected to said first and second valve means respectively, selector valve means communicating with all of said fluid-pressure conduits and operable to one position in which said pilot valve conduit is in communication with the fluid-pressure conduit of the first valve means and to another position in which said pilot valve conduit is in communication with the fluid-pressure conduit of said second valve means, a motor-driven timer, cyclically operating means comprising a member driven by said timer for actuating the first-mentioned pilot valve means at predetermined times to modify the setting thereof, and means comprising another member driven by said timer for causing operation of said selector valve means from the first to the second mentioned position thereof at predetermined times.

7. Apparatus for regulating the temperature of a fluid material, comprising a container having a heat exchanger, conduit means for admitting said material to said container, valve means in said conduit means, conduit means for admitting to said exchanger a temperature-affecting agent to influence the temperature of said material, valve means in the last mentioned conduit means, means in heat sensing relation to the material in said container and responsive to temperature in said container, pilot valve means having a fluid-pressure conduit connected thereto and controlled by said temperature-responsive means for varying the pressure in said conduit in accordance with the temperature in said container, fluid-pressure conduits connected to said first and second valve means respectively, selector valve means communicating with all of said fluid-pressure conduits and operable to one position in which said pilot valve conduit is in communication with the fluid-pressure conduit of the first valve means and to another position in which said pilot valve conduit is in communication with the fluid-pressure conduit of said second valve means, a motor-driven timer, a fluid-pressure conduit connected to said selector valve means for actuating the latter, a pilot valve connected to the last-mentioned conduit to control the pressure therein, and cyclically operating means operated by said timer for actuating the last-mentioned pilot valve at predetermined times to operate said selector valve from the first to the second mentioned position thereof and thereby to transfer the pressure in the conduit of the first-mentioned pilot valve from the first valve means to the second valve means.

EDGAR L. STILSON.

REFERENCES CITED

The following references are of record in the file of this patent:

UNITED STATES PATENTS

| Number | Name | Date |
| --- | --- | --- |
| 2,063,166 | Jansee | Dec. 8, 1936 |
| 2,073,825 | Beck et al. | Mar. 16, 1937 |
| 2,135,512 | Holven | Nov. 8, 1938 |
| 2,315,683 | Ziegler | Apr. 6, 1943 |
| 2,343,464 | Lienau et al. | Mar. 7, 1944 |